(12) United States Patent
Bouchard et al.

(10) Patent No.: US 11,385,182 B2
(45) Date of Patent: Jul. 12, 2022

(54) HYBRID LASER-INDUCED BREAKDOWN SPECTROSCOPY SYSTEM

(71) Applicant: NATIONAL RESEARCH COUNCIL OF CANADA, Ottawa (CA)

(72) Inventors: Paul Bouchard, Boucherville (CA); Mohamad Sabsabi, Boucherville (CA); Alain Blouin, Boucherville (CA); Christian Padioleau, Boucherville (CA)

(73) Assignee: NATIONAL RESEARCH COUNCIL OF CANADA

(*) Notice: Subject to any disclaimer, the term of this patent is extended or adjusted under 35 U.S.C. 154(b) by 0 days.

(21) Appl. No.: 17/053,093

(22) PCT Filed: May 9, 2019

(86) PCT No.: PCT/CA2019/050615
§ 371 (c)(1),
(2) Date: Nov. 5, 2020

(87) PCT Pub. No.: WO2019/213765
PCT Pub. Date: Nov. 14, 2019

(65) Prior Publication Data
US 2021/0072159 A1    Mar. 11, 2021

Related U.S. Application Data

(60) Provisional application No. 62/670,399, filed on May 11, 2018.

(51) Int. Cl.
*G01N 21/71* (2006.01)
*G01J 3/02* (2006.01)
(Continued)

(52) U.S. Cl.
CPC .......... *G01N 21/718* (2013.01); *G01J 3/0272* (2013.01); *G01J 3/0291* (2013.01);
(Continued)

(58) Field of Classification Search
CPC ............. G01J 2003/1243; G01J 3/0208; G01J 3/0272; G01J 3/0291; G01J 3/1804;
(Continued)

(56) References Cited

U.S. PATENT DOCUMENTS 4,815,849 A * 3/1989 Sullivan .................... G01J 3/02
356/328
7,382,498 B1   6/2008 Cook
(Continued)

FOREIGN PATENT DOCUMENTS

| CN | 102359949 A | 2/2012 |
|----|-------------|--------|
| CN | 203732444 U | 7/2014 |
| CN | 107941761 A | 4/2018 |

OTHER PUBLICATIONS

Wiens, Roger C., et al. "The ChemCam instrument suite on the Mars Science Laboratory (MSL) rover: Body unit and combined system tests." Space science reviews 170.1 (2012): 167-227.
(Continued)

*Primary Examiner* — Hina F Ayub

(57) ABSTRACT

A LIBS system to detect constituent elements of interest within a sample from plasma light resulting from irradiation of this sample is presented. The LIBS system has a hybrid configuration which provides both a low-resolution spectrum of the plasma light covering a broad spectral range, and a high-resolution spectrum of the same plasma light over a narrow spectral range centered on a spectral line or feature of a constituent element of interest of the sample. In some implementations, the LIBS system has a portable design and can perform onsite sample analyses.

15 Claims, 11 Drawing Sheets

(51) Int. Cl.
  *G01J 3/36* (2006.01)
  *G01J 3/443* (2006.01)
  *G01J 3/18* (2006.01)
  *G01J 3/28* (2006.01)
(52) U.S. Cl.
  CPC .......... *G01J 3/1804* (2013.01); *G01J 3/2803* (2013.01); *G01J 3/36* (2013.01); *G01J 3/443* (2013.01); *G01N 2201/0221* (2013.01)
(58) Field of Classification Search
  CPC .... G01J 3/2803; G01J 3/36; G01J 3/44; G01J 3/443; G01N 21/718; G01N 2201/0221
  See application file for complete search history.

(56) References Cited

U.S. PATENT DOCUMENTS

| | | | |
|---|---|---|---|
| 7,518,722 B2 | 4/2009 | Julian et al. | |
| 9,383,260 B1 | 7/2016 | Yoo et al. | |
| 9,506,869 B2 | 11/2016 | Quant et al. | |
| 9,885,606 B1 | 2/2018 | Mitchell | |
| 2007/0076200 A1* | 4/2007 | Martin | G01N 21/6486 356/318 |
| 2012/0206722 A1 | 8/2012 | Grigoropoulos et al. | |
| 2013/0016349 A1 | 1/2013 | Effenberger, Jr. et al. | |
| 2014/0204377 A1 | 7/2014 | Day et al. | |
| 2015/0346103 A1* | 12/2015 | Wang | G01J 3/06 356/318 |
| 2015/0377805 A1 | 12/2015 | Sackett | |
| 2017/0146404 A1 | 5/2017 | Pylkkanen | |
| 2018/0202862 A1* | 7/2018 | Jean-Ruel | G01J 3/2803 |
| 2018/0348141 A1* | 12/2018 | Hardman | G01J 3/027 |

OTHER PUBLICATIONS

López-Miranda, B., et al. "A LIBS method for simultaneous monitoring of the impurities and the hydrogenic composition present in the wall of the TJ-II stellarator." Review of Scientific Instruments 87.11 (2016): 11D811.

Rakovský, J., et al. "A review of the development of portable laser induced breakdown spectroscopy and its applications." Spectrochimica Acta Part B: Atomic Spectroscopy 101 (2014): 269-287.

Supplementary Partial European Search Report issued for European patent application No. EP 19 800 319.6, dated Feb. 9, 2022.

* cited by examiner

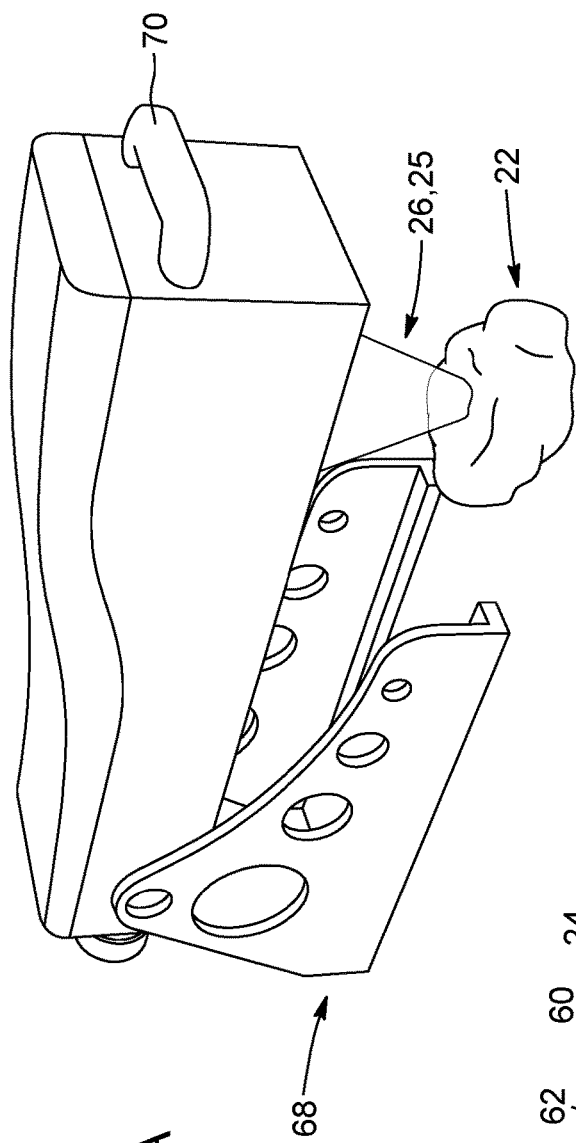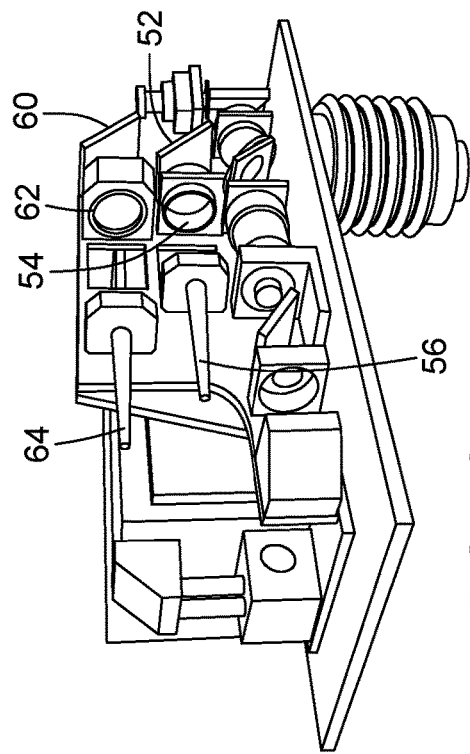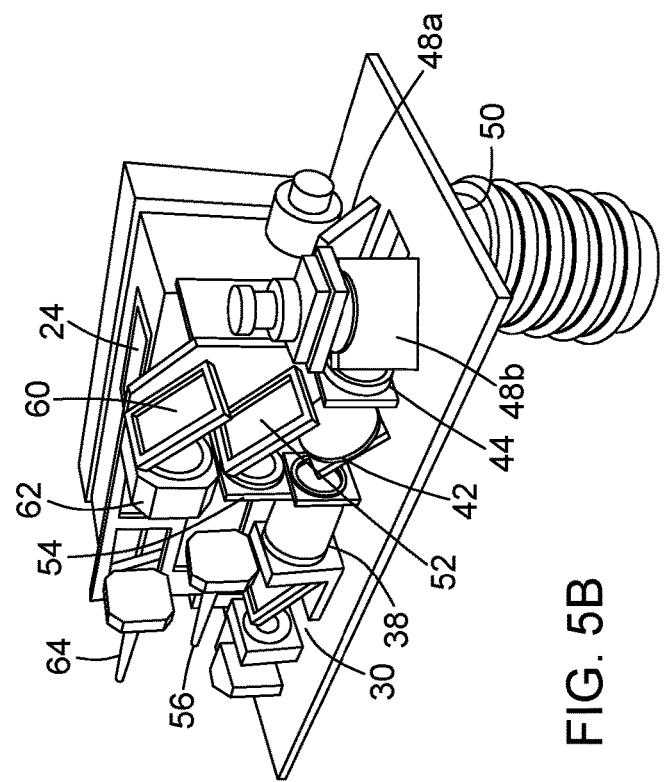

HYBRID LASER-INDUCED BREAKDOWN SPECTROSCOPY SYSTEM

CROSS REFERENCE TO RELATED APPLICATIONS

This application is a filing under 35 U.S.C. § 371 of International Patent Application PCT/CA2019/050615, filed on May 9, 2019, which claims priority to U.S. Provisional Application No. 62/670,399, filed on May 11, 2018, each of which is incorporated by reference in its entirety.

TECHNICAL FIELD

The technical field generally relates to material analysis and more particularly concerns a hybrid LIBS system.

BACKGROUND

Laser-induced breakdown spectroscopy (LIBS) is a well-known technique to retrieve elemental information from a given sample. A typical LIBS measurement is performed as follows: a short laser pulse is sent and focused onto a sample surface; the surface is rapidly heated by the laser pulse, part of the material is vaporized, and the gas is transformed into plasma, the plasma composition being representative of the sample's elemental content; excited electrons in the plasma eventually return to the ground state of their associated atoms as the plasma cools, and the radiative electron recombination emits photons with discrete energies allowed by their associated atoms energy levels; and the emitted photons are collected and sent in a spectrometer to produce optical emission spectra. The spectral distribution of the spectra (intensity versus wavelength) is linked to the elemental composition of the plasma, hence to the elemental composition of the sample. For example, see U.S. Pat. No. 6,008,897 and references cited therein.

LIBS systems known in the art typically fall within one of three types:

1—Laboratory LIBS systems: Systems of this type are built to have optimal performance in terms of laser energy, high power of resolution and sensitivity. This typically involves the use of bulky components for the laser source, spectrometer and detector. The working distance from the sample to the focusing lens (or what is known in the LIBS art as lens-to-sample distance LSD) typically varies from 25-50 cm to 2 m.

2—Industrial LIBS system: In this category, performance is also key in order to satisfy the industrial requirements, and bulky components can also be used as volume is not a critical issue. Additional requirements are the robustness of the overall system and low cost of ownership. Working distance or LSD varies from 30-50 cm to 2 m and is usually greater than 50 cm.

3—Handheld systems (less than 2 kg): systems of this type require the use of less bulky components than the previous types. However, the performance of components such as lasers, spectrometers and detectors is often related to their volume. For instance, reducing the size of a laser comes at the cost of less energy per pulse, and a less bulky spectrometer means less power of resolution and using a lower sensitivity detector. In addition, the working distance or LSD is in the order of few cm (generally less than 10 cm).

There remains a need in the field for a LIBS system that could combine higher sensitivity comparable to laboratory or industrial systems, with the portability of handheld systems.

SUMMARY

In accordance with one aspect, there is provided a Laser-Induced Breakdown Spectroscopy (LIBS) system to detect a constituent element of interest within a sample.

The LIBS system includes a pulsed laser source generating light pulses apt to create a plasma upon irradiating said sample. The LIBS system further includes an element detection assembly and a broadband detection assembly. The element detection assembly includes a high-resolution spectrometer having a narrowband spectral range covering a spectral feature of the constituent element of interest, whereas the broadband detection assembly includes a low-resolution spectrometer having a broadband spectral range.

The LIBS system further includes a probe head transportable by a user to a sample site and having a probing interface configured to irradiate the sample with the light pulses and collect resulting plasma light. Probe optics optically coupling the probing interface with the pulsed laser source, the low-resolution spectrometer and the high-resolution spectrometer are also provided. The probe optics define a first output light path directing a narrowband spectral portion of the plasma light encompassing said spectral feature of the constituent element of interest to the high-resolution spectrometer, and a second output light path directing a broadband spectral portion of said plasma light to the low-resolution spectrometer.

In some implementations, the probe optics include an upstream dichroic filter centered on a wavelength of the light pulses, the upstream dichroic filter being positioned to respectively direct:
  the light pulses from the laser source towards the probing interface; and
  the plasma light from the probing interface towards the element detection assembly and broadband detection assembly.

In some implementations, the probe optics further include a scanning mirror assembly provided between the upstream dichroic filter and the probing interface.

In some implementations, the probing interface comprises a transparent window.

In some implementations, the pulsed laser source is mounted within the probe head.

In some implementations, the probe optics include a downstream dichroic filter centered on the spectral feature of the constituent element of interest and disposed to separate the plasma light into said narrowband and broadband spectral portions.

In some implementations, the probe optics are mounted within the probe head.

In some implementations, the LIBS system further includes a first optical fiber link having a fiber input disposed to receive the narrowband spectral portion of the plasma light from the probe optics and a fiber output connected to the high-resolution spectrometer, and a second optical fiber link having a fiber input disposed to receive the broadband spectral portion of the plasma light from the probe optics and a fiber output connected to the low-resolution spectrometer.

In some implementations, the element detection assembly may include a photomultiplier detector or an avalanche photodiode coupled to an output of the high-resolution spectrometer.

In some implementations, the broadband detection assembly may include a CCD camera coupled to an output of the low-resolution spectrometer.

In some implementations, the high-resolution spectrometer is based on a Czerny-Turner configuration using cascaded primary and secondary gratings without intervening optics therebetween.

In some implementations, the low-resolution spectrometer is based on a folded or unfolded Czerny-Turner configuration comprising a planar grating.

In some implementations, the low-resolution spectrometer comprises a concave grating.

In some implementations, the LIBS system, further includes a mobile housing enclosing therein the element detection assembly and the broadband detection assembly, a power supply unit enclosed within said mobile housing, and wire connectors providing electrical and optical communication between the mobile housing and the probe head.

In accordance with another aspect, there is also provided a Laser-Induced Breakdown Spectroscopy (LIBS) system to detect a constituent element of interest within a sample from plasma light resulting from irradiation of said sample. The LIBS system includes an element detection assembly comprising a high-resolution spectrometer having a narrowband spectral range covering a spectral feature of the constituent element of interest, and a broadband detection assembly comprising a low-resolution spectrometer having a broadband spectral range.

In some implementations, the high-resolution spectrometer is based on a Czerny-Turner configuration using cascaded primary and secondary gratings without intervening optics therebetween.

In some implementations, the element detection assembly includes an avalanche photodiode, a photomultiplier tube, a single-photon avalanche diode (SPAD) or a Silicon photomultiplier detector (SiPM) coupled to an output of the high-resolution spectrometer.

In some implementations, the low-resolution spectrometer is based on a folded or unfolded Czerny-Turner configuration comprising a planar grating. Alternatively, the low-resolution spectrometer may include a concave grating.

In some implementations, the broadband detection assembly includes a CCD camera coupled to an output of the low-resolution spectrometer.

In some implementations, the LIBS system further includes probe optics defining a first output light path directing a narrowband spectral portion of the plasma light encompassing said spectral feature of the constituent element of interest to the high-resolution spectrometer, and a second output light path directing a broadband spectral portion of said plasma light to the low-resolution spectrometer. The probe optics may include a downstream dichroic filter centered on the spectral feature of the constituent element of interest and disposed to separate the plasma light into said narrowband and broadband spectral portions. The LIBS system may further include a first optical fiber link having a fiber input disposed to receive the narrowband spectral portion of the plasma light from the probe optics and a fiber output connected to the high-resolution spectrometer, and a second optical fiber link having a fiber input disposed to receive the broadband spectral portion of the plasma light from the probe optics and a fiber output connected to the low-resolution spectrometer.

In some implementations, the LIBS system may be optically coupled to a pulsed laser source generating light pulses apt to create a plasma upon irradiating said sample. The LIBS system may further include a probe head transportable by a user to a sample site and having a probing interface configured to irradiate the sample with the light pulses and collect resulting plasma light. The pulsed laser source may be mounted within the probe head.

In some implementations, the probe optics may include an upstream dichroic filter centered on a wavelength of the light pulses, the upstream dichroic filter being housed in the probe head and positioned to respectively direct:
 the light pulses from the laser source towards the probing interface; and
 the plasma light from the probing interface towards the element detection assembly and broadband detection assembly.

In some implementations, the LIBS system further includes a mobile housing enclosing therein the element detection assembly and the broadband detection assembly, a power supply unit enclosed within said mobile housing, and wire connectors providing electrical and optical communication between the mobile housing and the probe head.

Other features and advantages of the invention will be better understood upon reading of embodiments thereof with reference to the appended drawings.

BRIEF DESCRIPTION OF THE DRAWINGS

FIG. 5A is a side elevation view of the exterior of a probe head according to one embodiment; FIGS. 5B and 5C are side elevation views from two different directions of the interior of the probe head of FIG. 5A.

DETAILED DESCRIPTION

Figure 1:
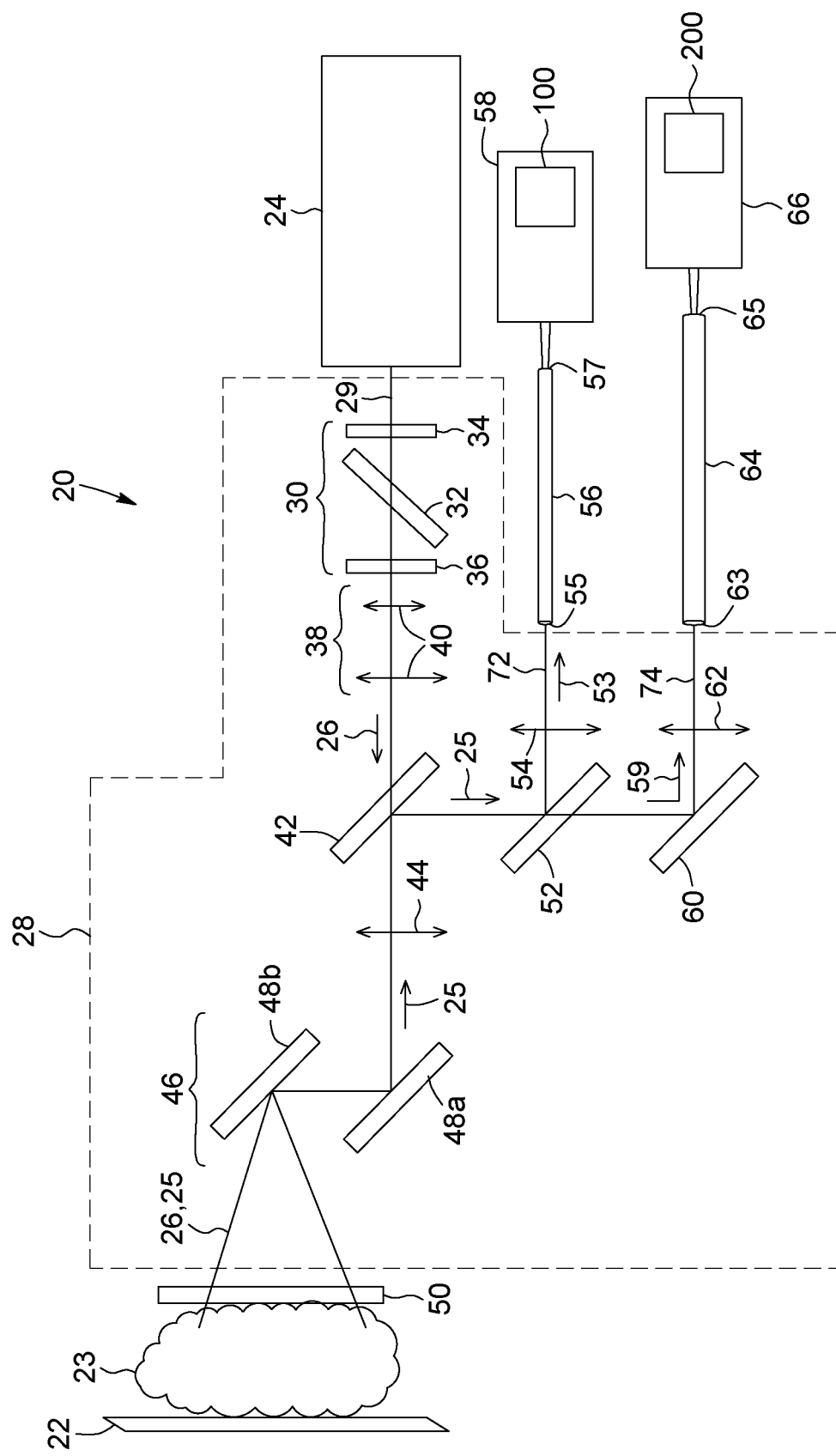
FIG. 1 is a schematic representation of a LIBS system according to one embodiment.

Embodiments described herein generally concern a LIBS system to detect a constituent element of interest within a sample.

As readily understood by those skilled in the art, LIBS generally relies on the use of a repetitively-fired laser source to emit intense and short pulses of light that are used to ablate/vaporize matter from a sample target. The interaction of the light pulses with the vaporized matter creates a plasma plume, which in turn radiates light. The analysis of the plasma-emitted light brings qualitative and quantitative information on the nature and concentration of the constituent elemental components of the target. More specifically, the qualitative and quantitative data related to the elemental components of the target is obtained from the processing and analysis of the spectral signature of the plasma-emitted light.

In a typical LIBS configuration, the light emitted by the plasma is optically collected and brought into a spectrometer, whose function is to extract the spectral information contained in the plasma-emitted light. The output of the spectrometer consists of a spectrum (in the form of a two-dimensional profile representing the light intensity vs. optical wavelength), which is characteristic of the collected light. The spectral distribution is recorded by means of a detector (often a line or 2-D camera).

The spectral profile provided by the spectrometer is made up of a collection of spectral lines. Each of these lines is related to an element present in the plasma plume. The elements found in the plasma come from the ablated/vaporized matter from the target and from the ambient gas, if any. The analysis of the spectral lines provides information on the nature of the elements in the plasma as well as their concentration.

In some implementations, the LIBS systems presented herein have a hybrid configuration which provides both a low-resolution spectrum of the plasma light covering a broad spectral range, and a high-resolution spectrum of the same plasma light over a narrow spectral range centered on a spectral line or feature of a constituent element of interest of the sample.

LIBS systems according to the present description may be useful in a variety of context where an elemental analysis of a sample is desired, such as soils or organic products analysis, the evaluation of minerals and other samples from the mining industry, material science and thin-film analysis, pharmaceutical products monitoring, material sorting and recycling, archeology and cultural artifacts studies, etc.

In some implementations, the present LIBS system may be of use in the context of mining, in particular gold mining. Gold mines are very important economic assets for many countries in the world. However, mining industries are facing increasing decisional challenges associated with lower grade ore and complexity of mineralization with higher impurity levels, which imply more frequent sample analyses in the production process. Mining sample analyses performed using conventional techniques typically involve wait times of at least 24 hours, causing production delays on the mining or exploration sites and thus increasing the operating and production costs.

In order to address these issues, the mining industry would benefit from the measure of precious metal concentration in real time and on site during the different exploration and mining production stages. In the case of gold, the ability to measure an average concentration down to about 1 ppm is desired. Existing technology, such as infrared spectroscopy, allows determining the mineralogy of the rock samples (quartz, pyrite, chalcopyrite, sphalerite, arsenopyrite, etc.), but the elemental composition is out of reach with this technique. Furthermore, X-ray fluorescence has been used successfully for determining the concentration of some basic metals such as copper, zinc and nickel; it is however inadequate for quantifying gold concentration, because of the low sensitivity and poor limits of detection. Additionally, the gold spectral line used in x-ray fluorescence suffers from interference with a strong zinc line which compromises the sensitivity of this technique for the determination of gold concentration.

LIBS technology is a suitable candidate for providing the desired analysis of gold samples. However, the detection of gold in rocks by prior art LIBS setups or instrumentation at such low concentration levels requires the use of high resolution spectrometer and highly sensitive ICCD detector which are bulky, costly and not robust; as a result of these drawbacks, the prior art LIBS instrumentation is not well adapted for onsite and harsh mining environment.

Advantageously, embodiments of LIBS systems described herein can provide a fast method for measuring the content of gold, and identifying the matrix in which gold is embedded. In addition, such embodiments provide a portable instrument that can be brought onsite for fast analysis without sample preparation.

LIBS System

Referring to FIG. 1, there is schematically illustrated a LIBS system 20 according to one embodiment. It will be readily understood that the configuration illustrated and described herein is shown by way of example only and is in no way meant as limitative to the invention.

In some implementations, the illustrated LIBS system can be designed in a compact portable arrangement and can be brought to a sample 22 for analysis. Features of such an arrangement are described and explained further below.

The LIBS system 20 may first include a pulsed laser source 24 generating light pulses 26 apt to create a plasma 23 upon irradiating the sample 22, according to the LIBS process described above. As well known in the art, the measurement sensitivity depends on the laser beam fluence (defined as the ratio corresponding to the laser pulse energy divided by the area of the beam spot) at the target surface. For instance, to achieve the ablation of the target material and create a plasma, a minimum (threshold) value of the fluence must be reached. Furthermore, the sensitivity is a function of the radiant flux emitted by the plasma; for a given fluence, the larger the plasma size (that is, the larger the beam spot size), the higher the total radiant flux which can be collected by the system. By way of example, the pulsed laser source 24 may be embodied by a flash lamp-pumped (FP) or diode-pumped solid-state (DPSS) laser source with active Q-switching, or the like. The light pulses may having a pulse energy from a few mJ to a few hundreds of mJ; a spot size (diameter) from a few 10s µm to 1 mm; and a repetition rate from a few Hz to 100 Hz. In accordance with some implementations, the duration of the laser pulses is short, for example in the nanosecond regime. The full width at half-maximum (FWHM) of the pulses may for example be within the range of a few nanoseconds. Therefore, in this regime, the plasma light emission begins just after the laser pulse firing; it then grows, decays and finally disappears after a certain period of time, referred to as the plasma lifetime.

Hybrid Detection Scheme

In accordance with some implementations, the LIBS system 20 has a hybrid configuration including two different detection schemes, enabled by two separate detection assemblies: an element detection assembly 58, and a broadband detection assembly 66. The element detection assembly 58 includes a high-resolution spectrometer 100 having a narrowband spectral range covering a spectral feature of the constituent element of interest, whereas the broadband detection assembly 66 includes a low-resolution spectrometer 200 having a broadband spectral range.

In the context of the present description, the term "resolution" in meant to refer to the spectral resolution of the corresponding spectrometer, typically defined as the minimum wavelength difference between two wavelengths that can be resolved unambiguously. The expression "high-resolution" is meant to refer to a resolution sufficient to allow the identification of a spectral feature of the constituent element of interest for a given application. The expression "narrowband" is meant to refer to a spectral bandwidth broad enough to cover the spectral feature of interest while being small enough to distinguish this spectral feature. By contrast, the expression "low-resolution" and "broadband" are meant to refer to a resolution and spectral range allowing an overview of the spectral contents of the plasma light without necessarily permitting identification of all individual lines. Furthermore, it will be readily understood that the terminology explained above is used herein in relatively, that is, to distinguish the different components of the LIBS system from each other without imparting limits on the scope of protection.

In some embodiments the high-resolution spectrometer 100 of the element detection assembly 58 may be based on the so-called Czerny-Turner configuration or Czerny-Turner spectrometer, a dominant design of spectrometers used in LIBS analysis. In such a configuration, the received plasma light is transferred to an array detector via an optical path that involves one or more dispersing elements. In other variants, the high-resolution spectrometer may be based on other designs known in the art, such as for example an echelle spectrometer.

Figure 2:
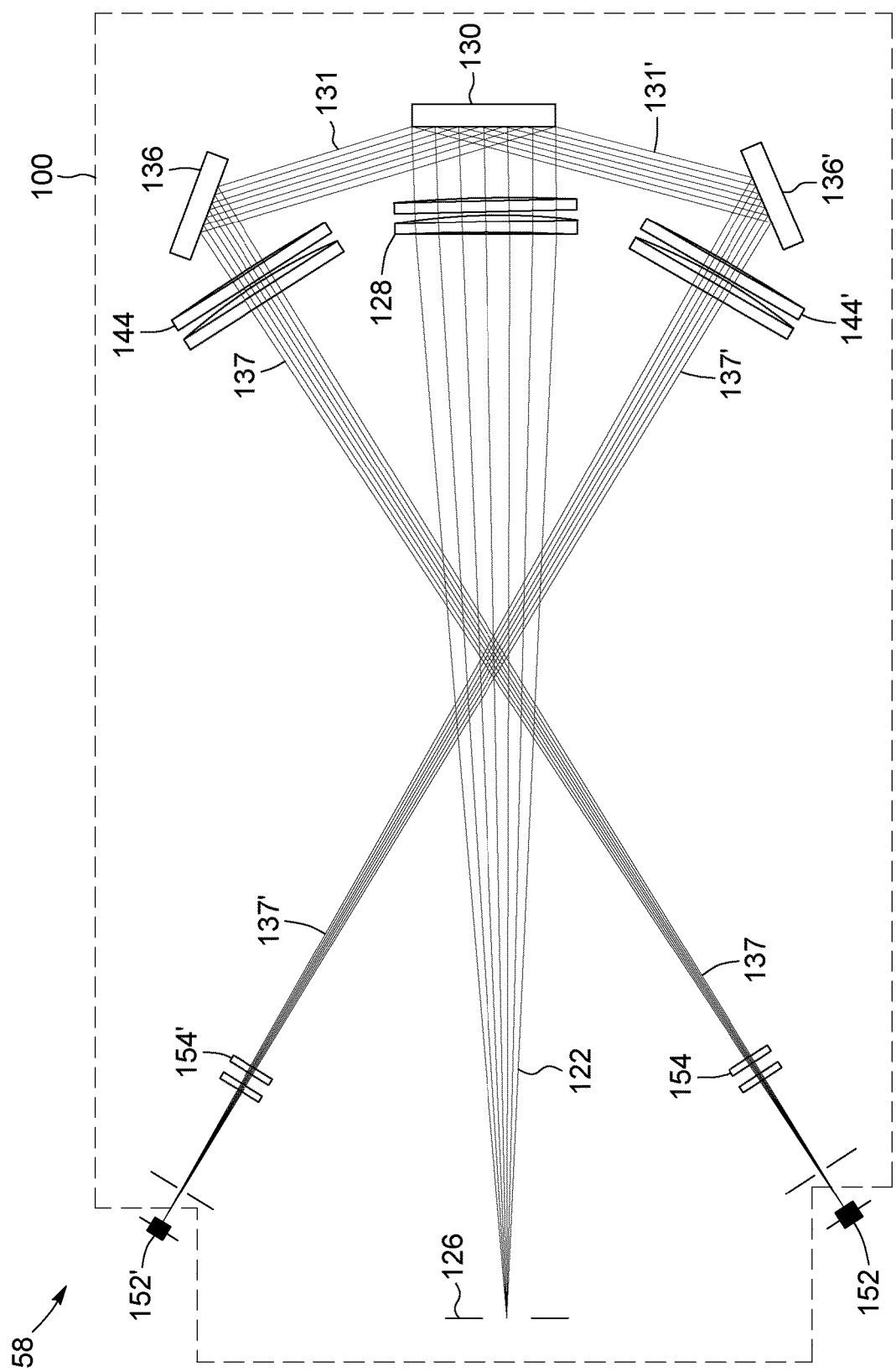
FIG. 2 is a schematic representation of a high-resolution spectrometer design according to one embodiment.

Referring to FIG. 2, there is shown an exemplary design for the element detection assembly 58. In this example, the high-resolution spectrometer 100 is based on a Czerny-Turner design using cascaded gratings. Such a design is shown in provisional patent application No. 62/662,468 filed on Apr. 25, 2018 and entitled "High resolution and high throughput spectrometer", the entire contents of which is incorporated herein by reference.

In the particular implementation of FIG. 2, the spectrometer 100 includes an input slit 126 through which a light beam 122 to be analyzed is received, followed by one or more collimating lenses 128. The input slit 126 creates a point-type source from the incoming light, and the light beam 122 is therefore spatially divergent upon entering the spectrometer. The collimating lens 128 is disposed across the path of the diverging light beam 122 and aligns its composing beamlets along a parallel direction, thereby collimating the light beam 122. Each collimating lens 128 may be embodied by a cylindrical lens or by a spherical singlet lens, a multi-element spherical lens assembly (such as a combination of plano-convex and meniscus lenses, or an achromatic doublet), by a non-spherical singlet lens (such as a best-form or aspheric lens), or the like.

The spectrometer 100 further includes a primary diffraction grating 130 on which the light beam 122 impinges. In the illustrated variant, the primary diffraction grating 130 is disposed immediately downstream the collimating lens 128, without intervening optics. In the illustrated implementation, the light beam 122 impinges on the primary diffraction grating 130 at normal incidence.

As known in the art, light at normal incidence on the primary diffraction grating 130 will be diffracted according to the so-called basic grating equation. Preferably, the primary diffraction grating 130 is designed such that light at wavelength of interest is diffracted within the −1 and +1 diffraction orders of the grating, defining two primary diffracted beams 131 and 131'.

The spectrometer 100 further includes two planar secondary diffraction grating 136 and 136' positioned in a path of the primary diffracted beams 131 and 131', preferably at normal incidence. Each secondary diffraction grating 136 and 136' diffracts the corresponding primary diffracted light beam 131 and 131' into a twice diffracted beam 137, 137'. In this embodiment, the primary and secondary diffraction gratings 130 and 136, 136' are disposed in a cascade without intervening optics therebetween. The provision of a pair of secondary diffraction gratings 136, 136' and corresponding branches can advantageously provide the parallel and simultaneous analysis of two different spectral features within a same spectral band of the light beam 122.

The spectrometer may further include one or more imaging lens 144, 144' disposed in the path of each twice diffracted beam 137, 137'. The spectrometer 100 therefore provides as output two focused light beams of limited spectral bandwidth in which different wavelengths are spatially separated. As will be noticed, in the illustrated variant the secondary diffraction gratings 136, 136' 62 are positioned so as to reflect the corresponding twice diffracted beam 137, 137' rearwardly of the primary grating 130, in a cross-beam configuration. Such a configuration can provide a long focal length within an optimized compact form factor.

The element detection assembly 58 further includes a photodetector 152, 152' apt to provide a spectrogram of the output light of both branches of the spectrometer 100. Each photodetector 152 may for example be embodied by an avalanche photodiode, a photomultiplier tube, a single-photon avalanche diode (SPAD), a Silicon photomultiplier detector (SiPM). The photodetector may also consist in a linear or two-dimensional array of individually addressable SPADs or SiPMs; such a combination of detectors would allow to record a portion of the spectral light distribution found in the spectrometer image plane. The photodetector 152, 152' may be spectrally resolved. In the illustrated variant, mechanisms providing a fine tuning of the wavelength on each photodetector 152, 152 may be provided. Such a mechanism may for example be embodied by a wavelength tuning refractive plate 154,154' used in transmission, whose angular position may be accurately controlled using miniature stepping motors with encoders (not shown).

Characteristics and relative positions of optical components of the spectrometer 100, define the range of wavelengths the spectrometer 100 is able to consider in the analysis. While such spectrometer can be applied for high-quality analysis, due to physical characteristics of the optical components of the spectrometer required to reach a sufficient range of wavelengths, the optical path defined by the optical components of the spectrometer 100 cannot be made arbitrarily short. In particular, the operation of the diffraction element 106 typically requires a certain minimum length for the optical path. In other words, the minimum size of the portable analyser employing the spectrometer 100 is limited due to the length of the optical path. On the other hand, having a portable analyser device of as small size as possible would be preferred to make the handling of the analyser device more convenient for the user and also to enable using the analyser device in narrow spaces. The configuration described above and other equivalents design can advantageously be helpful in minimizing the footprint of the spectrometer 100, favoring portability.

Figure 3A:
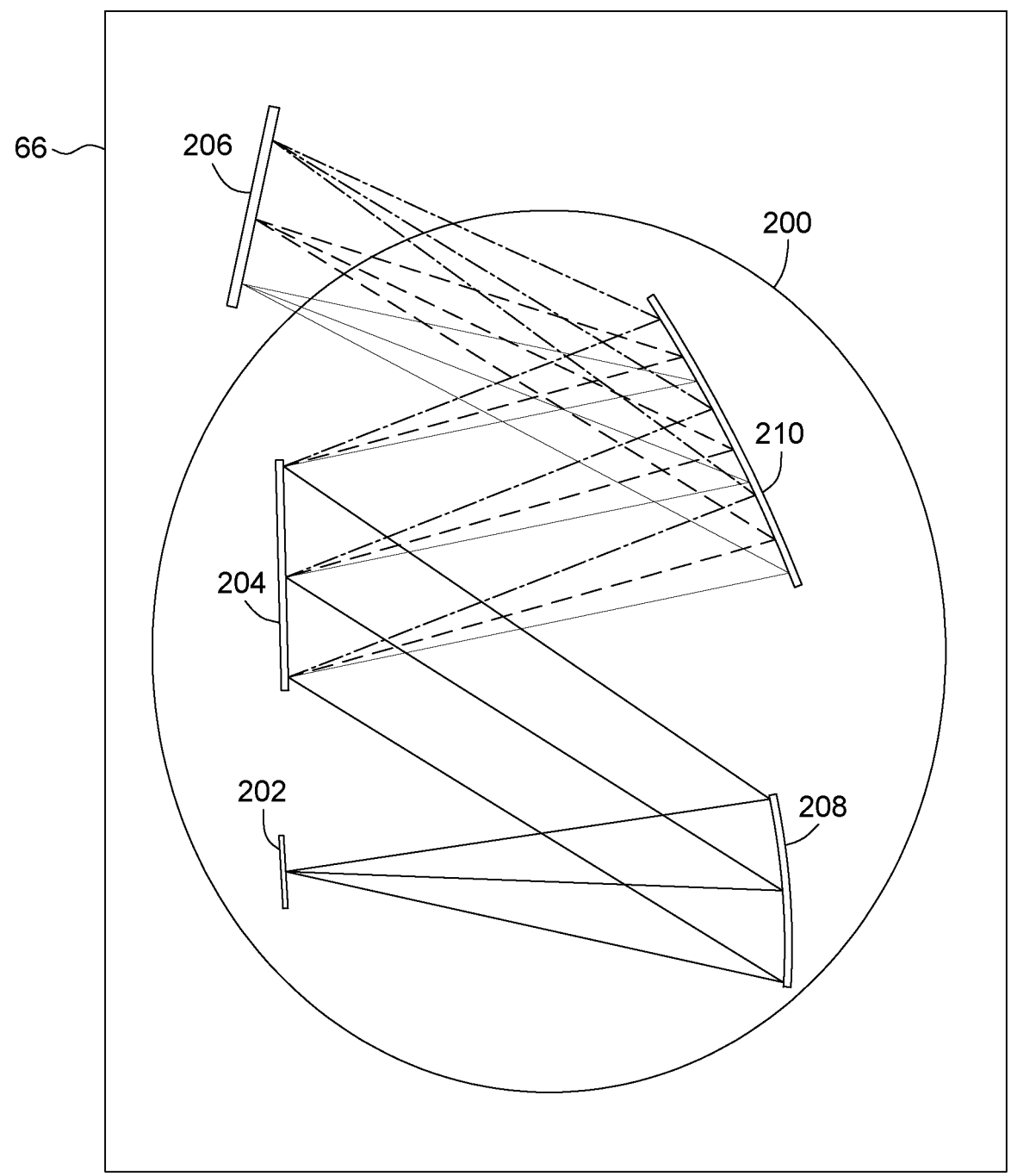
FIGS. 3A to 3C are schematic representation of three examples of designs of a low-resolution spectrometer.
Figure 3B:
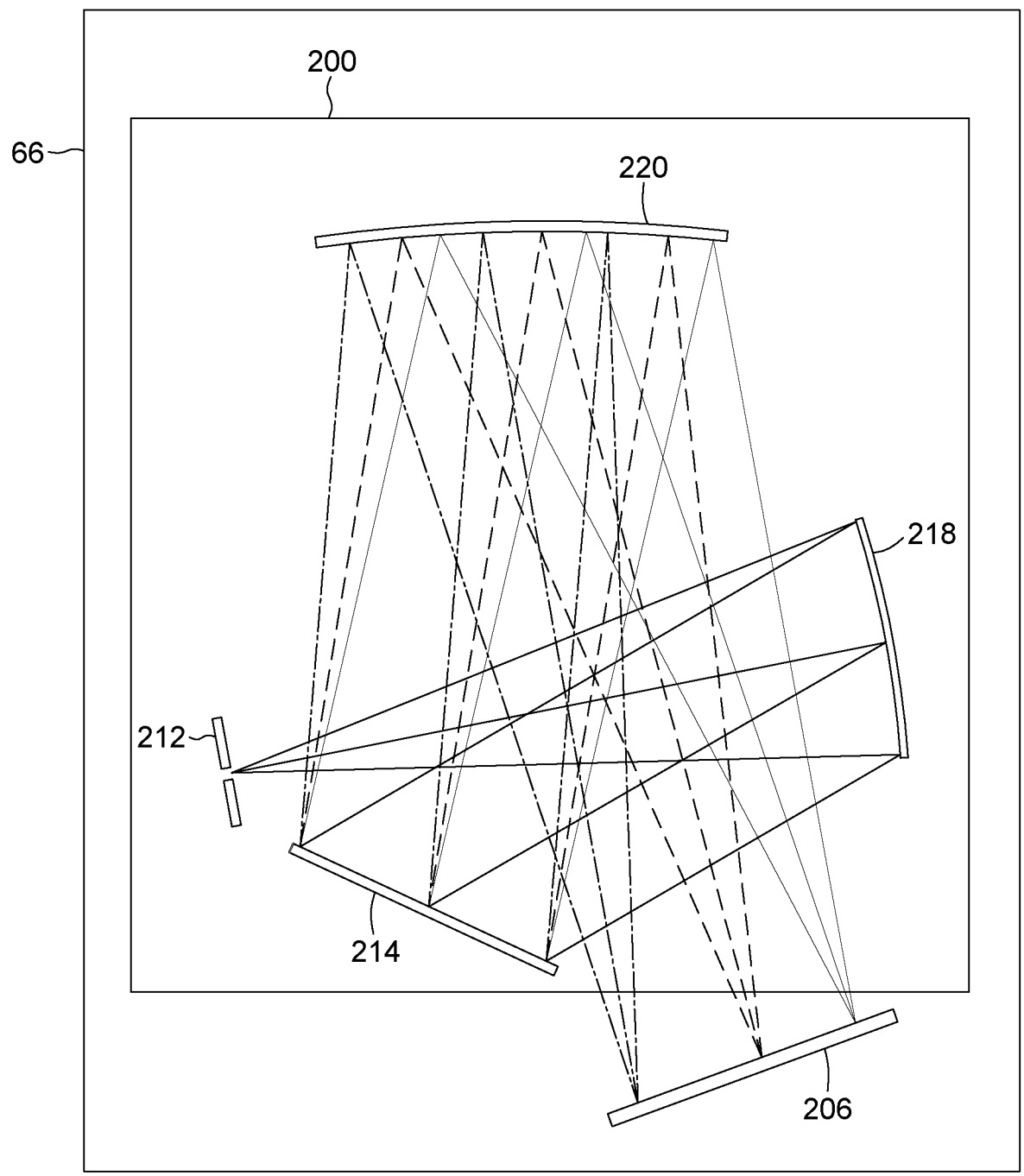
Figure 3C:
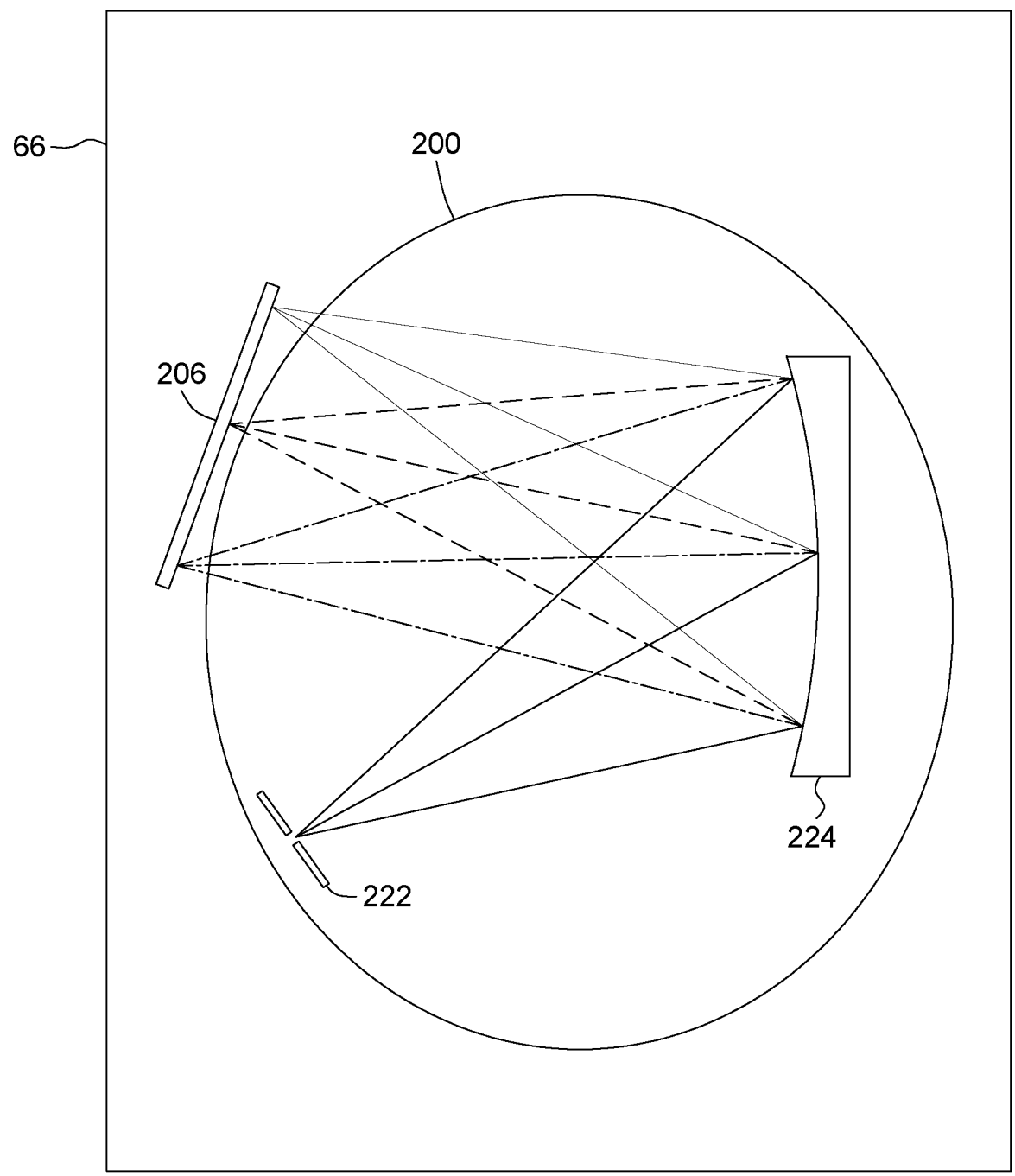
Figure 4:
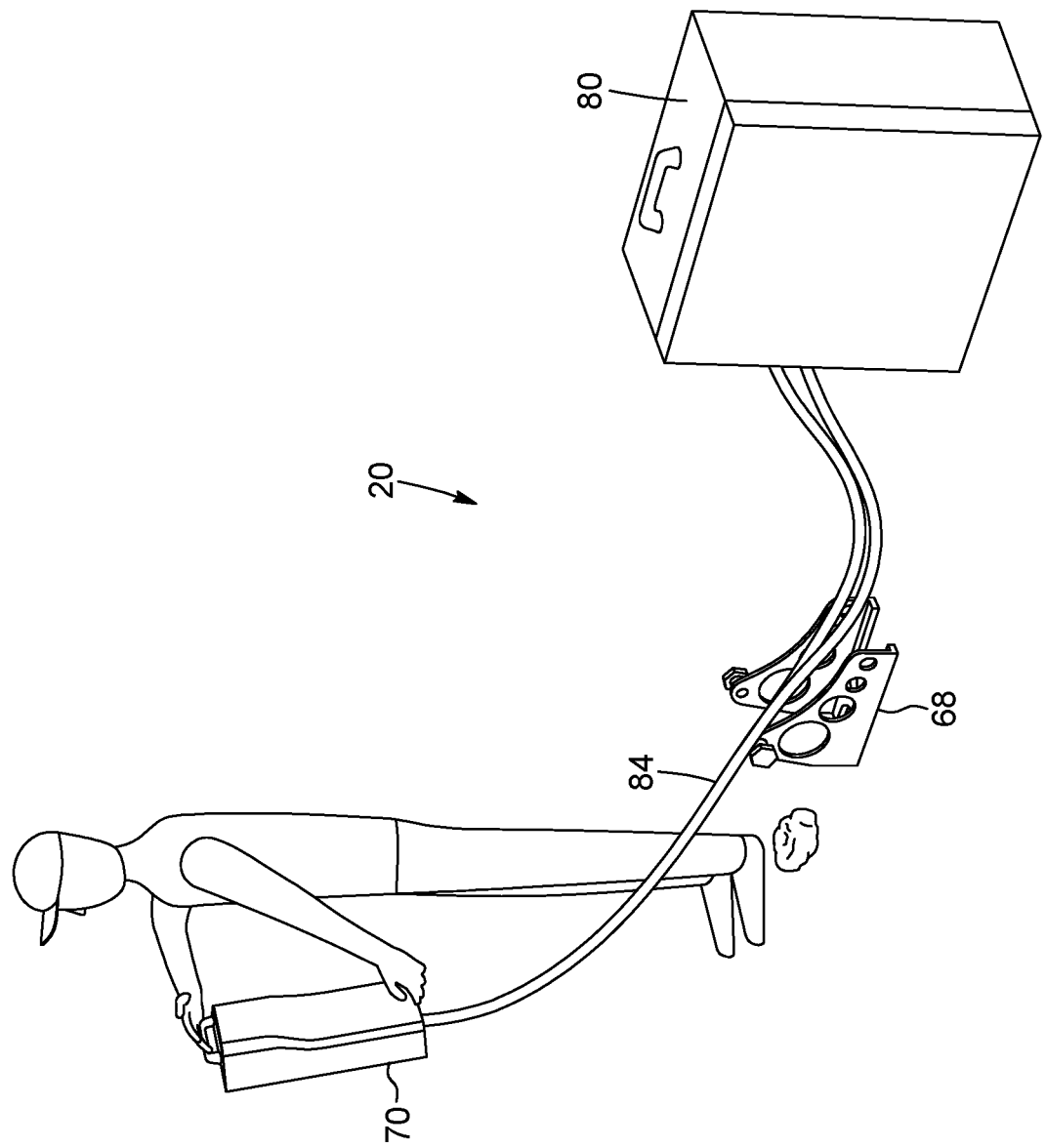
FIG. 4 is an illustrated of a portable design for a LIBS system according to one embodiment, shown in use.

Referring to FIGS. 3A to 3C, there is shown an example of a broadband detection assembly 66, including the low-resolution spectrometer 200 and a detector, for example a CCD line camera 206 as known in the art. In some embodiments the low-resolution spectrometer may also be based on a Czerny-Turner configuration, for example a single-grating design such as known in the art. By way of example, such a Czerny-Turner configuration may be of the unfolded type such as shown in FIG. 3A, and may include an input slit 202, a plane grating 204, a collimating spherical mirror 208 and a focusing spherical mirror 210. Referring to FIG. 3B, the Czerny-Turner configuration may also be of the folded/crossed type, in which the light paths intersect; this design allows a more compact form factor than its unfolded counterpart. Such a configuration includes an input slit 212, a plane grating 214, a collimating spherical mirror 218 and a focusing spherical mirror 220. In other embodiments, the low-resolution spectrometer may be based on the use of a concave grating. This design relies on a fewer number of optical components than the Czerny-Turner approach, since the beam collimating and imaging functionalities are both performed by the grating itself, owing to its concaveness. Referring to FIG. 3C, there is shown a typical basic concave grating design comprises an input slit 222 and a concave grating 224.

In accordance with some implementations, the high-resolution spectrometer 100, the low-resolution spectrometer 200 or both are operated in a time-gated regime. As is known to those skilled in the art, the temporal behaviour of the LIBS plasma-emitted light is correlated to the evolution of the plasma temperature and the electronic density. In an initial phase of the plasma lifetime, the plasma light is dominated by a "white light" continuum that has little intensity variation as a function of wavelength. This light is caused by bremsstrahlung and recombination radiation from the plasma, as free electrons and ions recombine in the cooling plasma. If the plasma light is integrated over the entire life-time of the plasma, this continuum light can seriously interfere with the detection of weaker emissions from minor and trace elements in the plasma. For this reason, LIBS measurements are usually carried out using time-resolved detection. In this way the strong background light from the initial phase can be removed from the measurements by turning the detector on after this background light has significantly subsided in intensity, but atomic emissions are still present. Relevant parameters for time-resolved detection generally include $t_d$, the time between plasma formation and the start of the observation of the plasma light, and $t_b$, the time period over which the light is recorded.

By selecting a proper time delay $t_d$ between the onset of the light pulse and the signal acquisition window, the optimum contrast between the intensity the spectral lines of interest and the signal background can be achieved. This increases the dynamic range of the measurement, which in turn contributes to maximize the sensitivity of the technique and to achieve lower values for the limit of detection (LOD).

When performing time-resolved measurements, the gated spectral signal is acquired at each laser shot (or laser pulse). To achieve time-resolved measurements, a CCD camera equipped with an image intensifier (ICCD) is used as detector. In this configuration, the image intensifier has two functions: it acts as a very fast optical shutter (typically with sub-ns rise and fall times), therefore allowing the selection of relevant gating parameters $t_d$ and $t_b$ with high accuracy and shot-to-shot reproducibility; and owing to its adjustable internal gain, it allows matching/optimizing the dynamic range of the input signal intensity with the camera's CCD sensor.

In some implementations, delayed signal acquisition ($t_d$) may also be performed using low cost line cameras such as those equipping some compact spectrometers. However, these detectors have substantial limitations related to the acquisition gate width ($t_b$), which in some cases cannot be set below a given value (e.g. the ms range).

Probe Optics

Referring back to FIG. 1 and with additional reference to FIGS. 5A and 5B, as will be readily understood by one skilled in the art, the LIBS system 20 may include probe optics 28 directing, shaping, focusing, collecting or otherwise acting on light travelling within the system.

The probe optics may define a probing light path 29 generally directing the light pulses 26 from the pulsed light source 24 to the sample 22 and collecting the resulting plasma light 25. A transparent window or equivalent structure can define a probing interface 50 through which light exists and enters the LIBS system 20. The probe optics 28 may further define a first output light path 72 directing a narrowband spectral portion 53 of the plasma light 25 encompassing the spectral feature of the constituent element of interest to the high-resolution spectrometer 100, and a second output light path 74 directing a broadband spectral portion 59 of the plasma light 25 to the low-resolution spectrometer 200. The probe optics 28 therefore optically couples the probing interface 50 with the pulsed laser source 24, the low-resolution spectrometer 200 and the high-resolution spectrometer 100.

In the illustrated embodiment, the probe optics 28 include, along the probing light path, a laser beam attenuator 30 positioned downstream the output of the pulsed laser source 24, for example embodied by a polarizer 32 at a 45 degrees angle with respect to the propagation direction of the light pulses 26 and positioned between a halfwave plate 34 and a quarterwave plate 36. The probe optics 28 next include a laser beam expander 38, here illustrated as lenses 40. The probe optics 28 may further include a focusing and imaging lens 44, and a scanning mirror assembly 46. The scanning mirror assembly 46 is for example embodied by a pair of pivoting mirrors 48a, 48b which can be jointly operated to spatially scan the light pulses 26 over the sample 22 through the transparent window 50, as is well known in the art. It will be readily understood that the laser beam attenuator 30, laser beam expander 38 focusing and imaging lens 44 and scanning mirror assembly 46 are typical components well known in the art of optics and that a variety of different components or configurations could alternatively be used, as well known to those skilled in this art.

Still referring to the configuration of FIG. 1, the probe optics 28 include an upstream dichroic filter 42 provided in the path of the light pulses 26, for example positioned between laser beam expander 38 and the focusing imaging lens 44. As known to those skilled in the art, dichroic filters are optical components having a birefringence designed to split incoming light according to spectral content. In the illustrated example, the upstream dichroic filter 42 is a bandpass filter centered on the wavelength of the light pulses 26; accordingly, the light pulses 26 are transmitted through the upstream dichroic filter 42, whereas the plasma light 25 at other wavelengths incident thereon is reflected. The upstream dichroic filter 42 is positioned to respectively direct the light pulses 26 from the laser source 24 towards the probing interface 50, and the plasma light 25 from the probing interface 50 towards the element detection assembly 58 and broadband detection assembly 66. By way of example, the upstream dichroic filter 42 may be disposed at a 45° angle with respect to the common propagation axis of the light pulses 26 and plasma light 25. Of course, in other configurations a notch filter could be used and/or the upstream dichroic filter 42 may be arranged to transmit the plasma light 25 and reflect the laser pulses 26.

The probe optics 28 next include a downstream dichroic filter 52 centered on the spectral feature of the constituent element of interest. The downstream dichroic filter is disposed to separate the plasma light 25 into the narrowband and broadband spectral portions 53 and 59. In the illustrated configuration, the downstream dichroic filter 52 is a notch filter reflecting the narrowband spectral portion 53 and transmitting through the broadband spectral portion 59. Of course, in other configurations a bandpass filter could be used and/or the downstream dichroic filter 52 may be arranged to transmit the narrowband spectral portion 53 and reflect the broadband spectral portion 59

Along the first output light path 72, the LIBS system 20 may include a first optical fiber link 56 having a fiber input 55 disposed to receive the narrowband spectral portion 53 of the plasma light from the probe optics 28, and a fiber output 57 connected to the high-resolution spectrometer 100. A first focusing lens 54 may be provided upstream the first optical fiber link 56 to focus the narrowband spectral portion 53 of the plasma light onto the fiber input 55. Of course, numerous other configurations are possible using any number of optical components as well known in the art.

Along the second output light path 74, the LIBS system 20 may further include a second optical fiber link 64 having a fiber input 63 disposed to receive the broadband spectral portion 59 of the plasma light from the probe optics 28, and a fiber output 65 connected to the low-resolution spectrometer 200. In the illustrated configuration, a wideband mirror 60 redirects the broadband spectral portion 59 in a direction parallel to the propagation direction of the narrowband spectral portion 53 and a second focusing lens 62 may be provided upstream the second optical fiber link 56 to focus the broadband spectral portion 59 of the plasma light onto the fiber input 63. Again, numerous other configurations are possible using any number of optical components as well known in the art.

Portable Design

Referring to FIGS. 4, 5A, 5B and 5C, in some implementation the LIBS system 20 described herein may be embodied in a portable design. By "portable" it is understood that an operator or user may carry all the components of the system to a site of a sample to perform the LIBS analysis on-site. It will be further understood that the portable design of the present LIBS system 20 does not necessarily involve that the system can be handheld, i.e. fit in an operator's hand, although in some implementations at least some components of the LIBS system 20 may be small enough to be handheld.

In the illustrated embodiment, the LIBS system includes probe head 70 transportable by a user or operator to a sample site. The probe head 70 includes a probing interface as defined above, i.e. configured to irradiate the sample with the light pulses and collect resulting plasma light. The pulsed laser source may be mounted within the probe head 70, although in some embodiment it may be part of a separate structure optically connected to the probe head via optical fiber. The probe optics, or at least some components thereof, may also be mounted within the probe head 70.

Referring more particularly to FIGS. 5A, 5B and 5C, an example conceptual design of a probe head 70 is illustrated. In this design, the probe head houses all of the components of the probe optics 28 as described above. Of course, other configurations could be implemented. In some variants, the probe head 70 may be mounted on a swiveling base pod 68 or similar structure facilitating its handling.

Referring back to FIG. 4, the LIBS system 20 further includes a mobile housing 80 in which are enclosed the element detection assembly and the broadband detection assembly. Other components may also be provided in the mobile housing 80, such as for example a power supply unit 82 for providing electrical power to active components of the system. Wire connectors 84 can provide electrical and optical communication between the mobile housing 80 and the probe head 70. In the illustrated embodiment, the mobile housing 80 is the size of a suitcase, although different form factors and sizes may be considered depending on the nature of the components housed therein. Depending on the intended context of use, the probe head 70 and mobile unit 80 may be made of rugged materials suitable to the environment of the sample site and apt to protect the components therein.

Example

Figure 6:
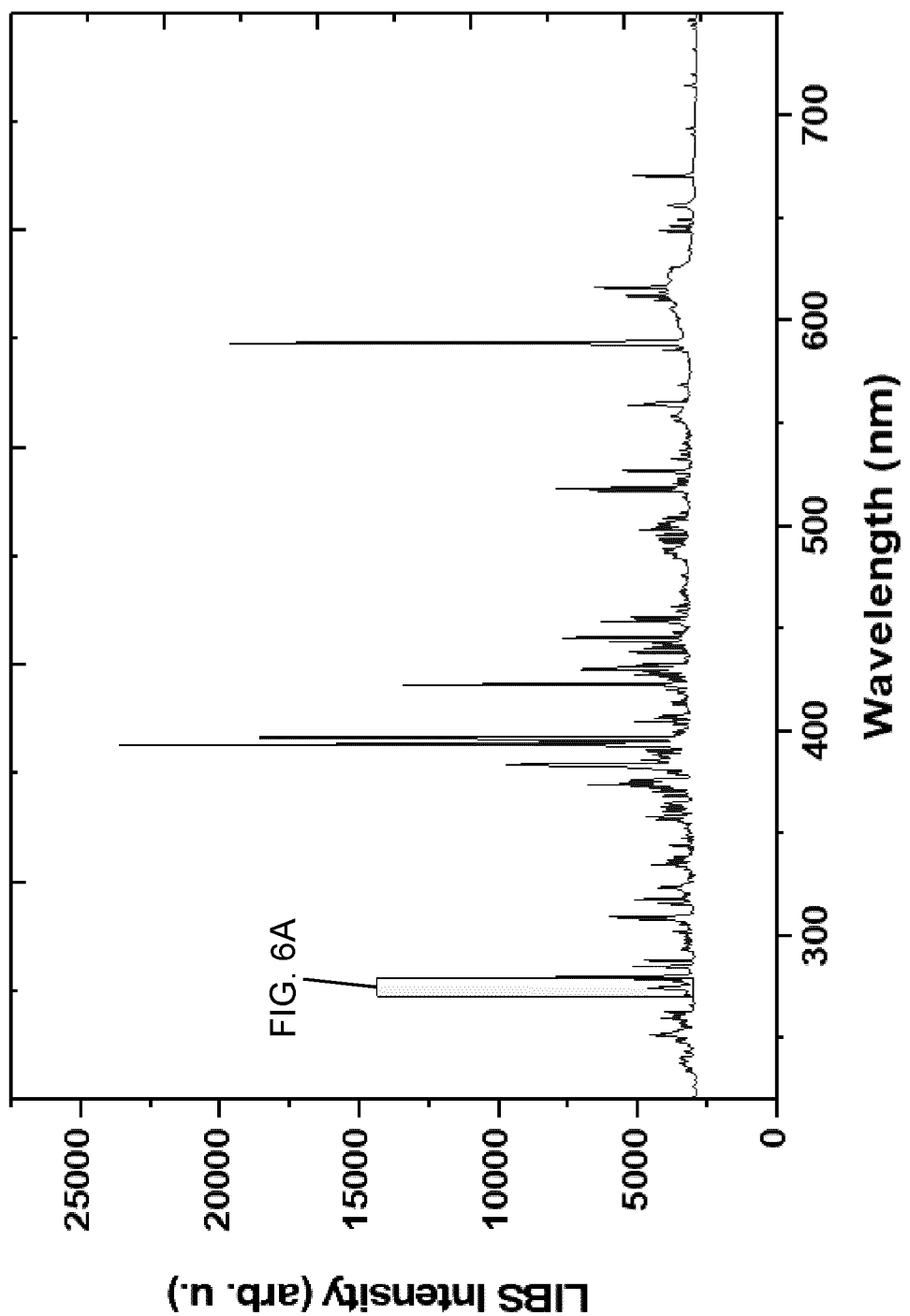
FIG. 6 is a graph showing a spectrum obtained with a broadband detection assembly according to one embodiment of a LIBS system.
Figure 7:
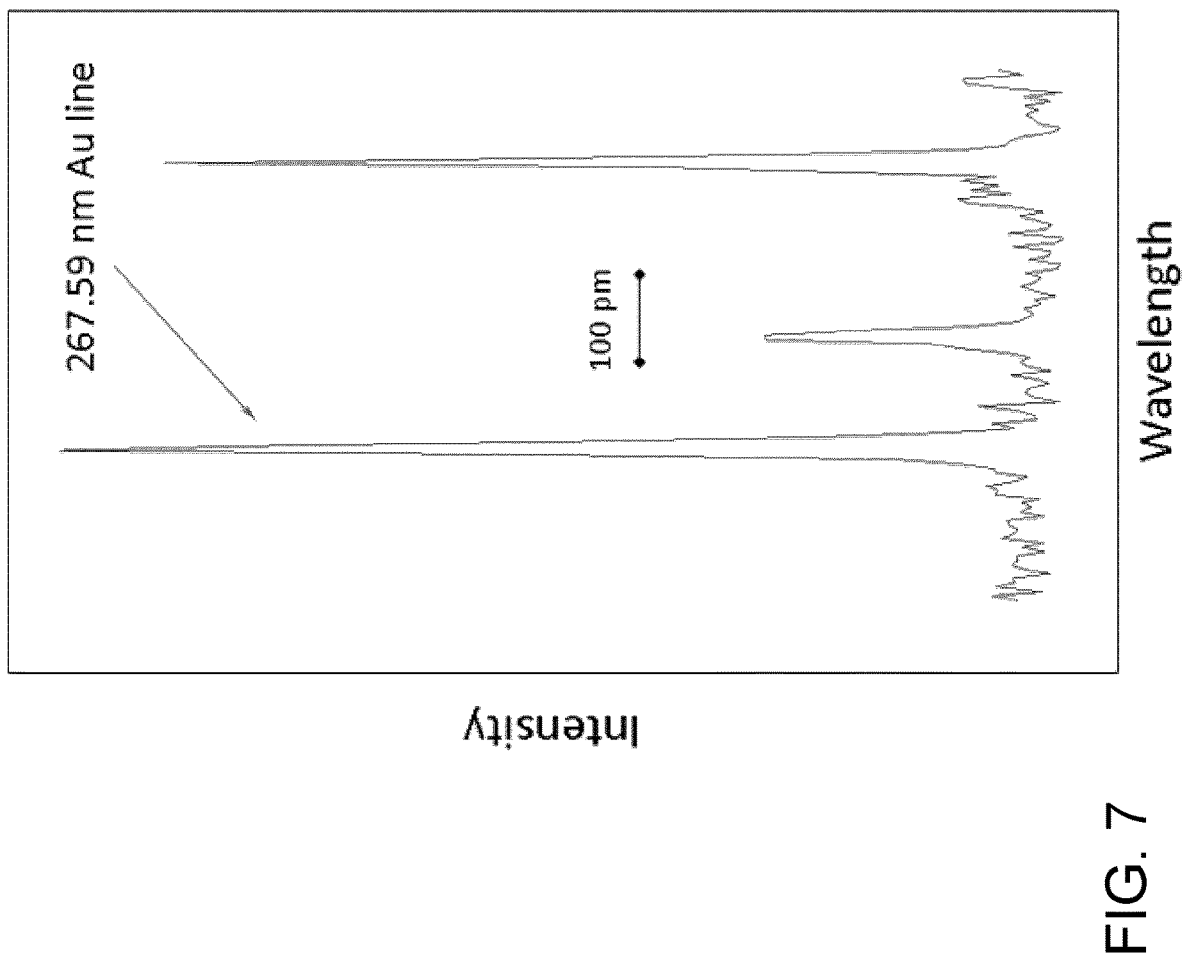
FIG. 7 is a graph showing a spectrum obtained with an element detection assembly according to one embodiment of a LIBS system.
Figure 8:
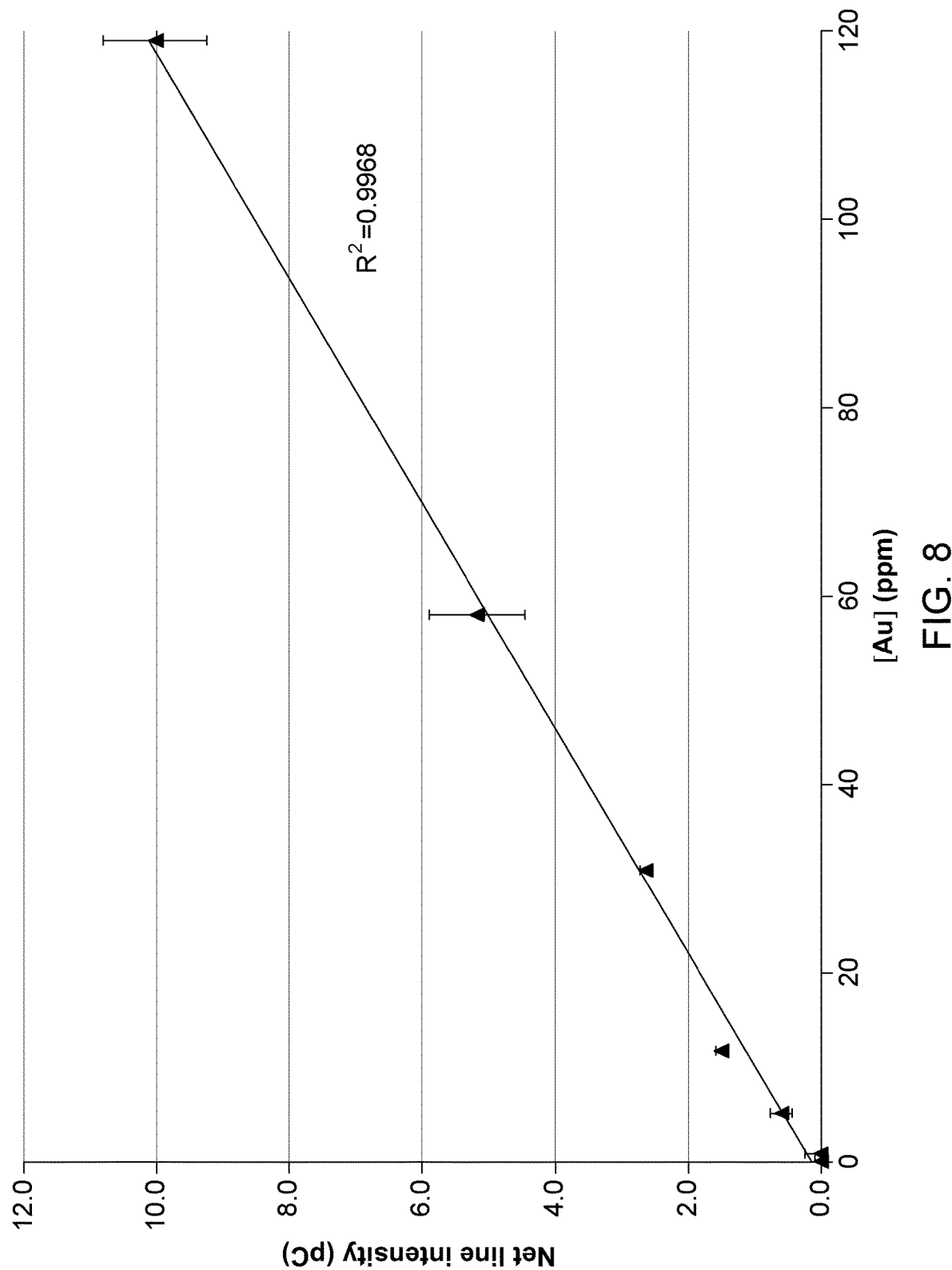
FIG. 8 is a calibration curve obtained using an elemental detection assembly according to one embodiment of a LIBS system.

Referring to FIGS. 6 to 8, examples of data that can be obtained using LIBS systems such as described herein are presented.

Figure 6A:
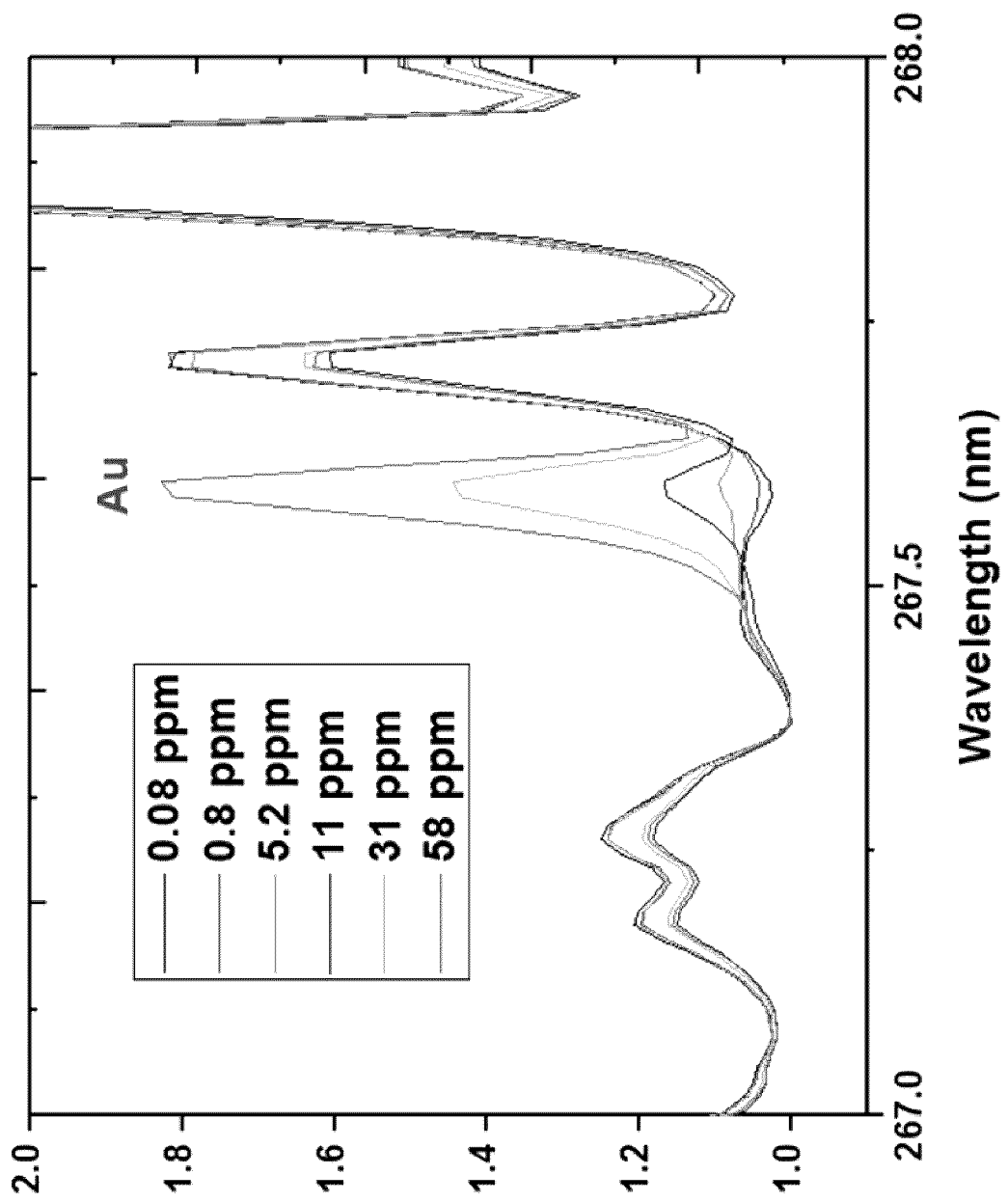
FIG. 6A is an enlarged view of the spectrum of FIG. 6 in the range between 267.0 nm and 268.0 nm.

FIGS. 6 and 6A illustrate the spectra obtained on a quartz chlorite matrix. The full spectrum obtained through the broadband detection assembly is shown, and a window illustrates the high-resolution spectrum obtained through the element detection assembly, showing the dependence of gold versus concentration. Furthermore, the full spectrum allows to draw quantitative information on the concentration of several elements contained in the matrix, such as Si, Mg, Ca, Na, etc., which may be present at the % level. This can be achieved by performing univariate analysis of the spectral data, using appropriate spectral lines found in the full spectrum. One can also deploy chemometric (multivariate) analysis methods and algorithms, such as the Principal Components Analysis PCA, and apply them to the spectral data extracted from the full spectrum. Such methods can be used to draw information pertaining to the mineralogy of the sample being probed, as known in the art.

FIG. 7 shows the narrowband spectrum obtained through the high-resolution spectrometer, centered on the 267.59 nm gold spectral line. As already mentioned above, univariate analysis can also be performed using the 267.59 nm line in order to obtain the trace concentrations of gold in the matrix. Moreover, information contained in the full spectrum, such as selected spectral background data or the energy density measured within a given spectral range, can be used to determine the proper univariate calibration parameters to be applied to the high-resolution data, as a function of the actual mineralogical matrix encountered.

FIG. 8 illustrates a calibration curve obtained with the high-resolution spectrometer described herein, again using univariate processing of the data obtained from the quartz chlorite reference gold samples.

Of course, numerous modifications could be made to the embodiments described above without departing from the scope of the invention as defined in the appended claims.

The invention claimed is:

1. A Laser-Induced Breakdown Spectroscopy (LIBS) system to detect a constituent element of interest within a sample, said LIBS system comprising:

a pulsed laser source generating light pulses apt to create a plasma upon irradiating said sample;

an element detection assembly comprising a high-resolution spectrometer having a narrowband spectral range covering a spectral feature of the constituent element of interest;

a broadband detection assembly comprising a low-resolution spectrometer having a broadband spectral range;

a probe head transportable by a user to a sample site and having a probing interface configured to irradiate the sample with the light pulses and collect resulting plasma light;

probe optics optically coupling the probing interface with the pulsed laser source, the low-resolution spectrometer and the high-resolution spectrometer, the probe optics defining a first output light path directing a narrowband spectral portion of the plasma light encompassing said spectral feature of the constituent element of interest to the high-resolution spectrometer, and a second output light path directing a broadband spectral portion of said plasma light to the low-resolution spectrometer.

2. The LIBS system according to claim 1, wherein the probe optics comprises an upstream dichroic filter centered on a wavelength of the light pulses, the upstream dichroic filter being positioned to respectively direct:
the light pulses from the laser source towards the probing interface; and
the plasma light from the probing interface towards the element detection assembly and broadband detection assembly.

3. The LIBS system according to claim 2, wherein the probe optics further comprises a scanning mirror assembly provided between the upstream dichroic filter and the probing interface.

4. The LIBS system according to claim 1, wherein the pulsed laser source and the probe optics are mounted within the probe head.

5. The LIBS system according to any claim 1, wherein the probe optics comprises a downstream dichroic filter centered on the spectral feature of the constituent element of interest and disposed to separate the plasma light into said narrowband and broadband spectral portions.

6. The LIBS system according claim 1, further comprising:
a first optical fiber link having a fiber input disposed to receive the narrowband spectral portion of the plasma light from the probe optics and a fiber output connected to the high-resolution spectrometer; and
a second optical fiber link having a fiber input disposed to receive the broadband spectral portion of the plasma light from the probe optics and a fiber output connected to the low-resolution spectrometer.

7. The LIBS system according to claim 6, wherein the element detection assembly comprises a photomultiplier detector or an avalanche photodiode coupled to an output of the high-resolution spectrometer and the broadband detection assembly comprises a CCD camera coupled to an output of the low-resolution spectrometer.

8. The LIBS system according to claim 1, wherein the high-resolution spectrometer is based on a Czerny-Turner configuration using cascaded primary and secondary gratings without intervening optics therebetween.

9. The LIBS system according to claim 1, wherein the element detection assembly comprises an avalanche photodiode, a photomultiplier tube, a single-photon avalanche diode (SPAD) or a Silicon photomultiplier detector (SiPM) coupled to an output of the high-resolution spectrometer.

10. The LIBS system according to claim 1, wherein the low-resolution spectrometer is based on a folded or unfolded Czerny-Turner configuration comprising a planar grating.

11. The LIBS system according claim 1, wherein the low-resolution spectrometer comprises a concave grating.

12. The LIBS system according to claim 1, wherein probe optics are mounted within the probe head.

13. The LIBS system according to claim 1, wherein the narrowband spectral range of the high-resolution spectrometer has a spectral range on the order of 1 nm or less, and the broadband spectral range of the low-resolution spectrometer is at least 2 orders of magnitude greater than that of the narrowband spectral range.

14. The LIBS system according to claim 1, wherein the high-resolution spectrometer has a resolution sufficient to allow the identification of the spectral feature of the constituent element of interest.

15. The LIBS system according to claim 1, wherein the broadband range of the low-resolution spectrometer is sufficiently broad to allow an overview of spectral contents of the plasma light.

\* \* \* \* \*